(12) United States Patent
BuAbbud et al.

(10) Patent No.: US 6,246,510 B1
(45) Date of Patent: Jun. 12, 2001

(54) LIGHT AMPLIFICATION APPARATUS WITH AUTOMATIC MONITORING AND CONTROLS

(75) Inventors: George H. BuAbbud, South Lake; Muneer Zuhdi, Arlington, both of TX (US)

(73) Assignee: Marconi Communications, Inc., Cleveland, OH (US)

(*) Notice: Subject to any disclaimer, the term of this patent is extended or adjusted under 35 U.S.C. 154(b) by 0 days.

(21) Appl. No.: 09/300,880

(22) Filed: Apr. 28, 1999

(51) Int. Cl.[7] ................................................. H01S 3/131
(52) U.S. Cl. ................................................................ 359/337
(58) Field of Search ..................................... 359/337, 341

(56) References Cited

U.S. PATENT DOCUMENTS

| | | | |
|---|---|---|---|
| 5,032,784 | * 7/1991 | Smith | 324/77 |
| 5,245,690 | * 9/1993 | Aida et al. | 359/341 |
| 5,537,570 | * 7/1996 | Ushirozawa | 359/341 |
| 5,547,283 | * 8/1996 | Kronberg | 374/162 |
| 5,822,112 | * 10/1998 | Itou et al. | 359/341 |
| 5,914,794 | * 6/1999 | Fee et al. | 359/110 |
| 6,064,501 | * 5/2000 | Roberts et al. | 359/341 |
| 6,072,609 | * 6/2000 | Matsuda | 359/110 |

* cited by examiner

*Primary Examiner*—Thomas H. Tarcza
*Assistant Examiner*—Deandra M. Hughes
(74) *Attorney, Agent, or Firm*—Jones, Day, Reavis & Pogue

(57) ABSTRACT

A light amplification system for amplifying a selected wavelength of light used for communicating information signals and having a microcontroller for substantially automatic start-up and shutdown and continuous monitoring of the critical parameters of the system.

18 Claims, 3 Drawing Sheets

LIGHT AMPLIFICATION APPARATUS WITH AUTOMATIC MONITORING AND CONTROLS

BACKGROUND OF THE INVENTION

1. Field of the Invention

The present invention relates to methods and apparatus for using optical fibers as communication transmission paths, and more specifically to the amplification of light waves carrying information signals such as TV signals or telephonic signals and the automatic control and monitoring of such apparatus.

2. Description of Related Art Including Information Disclosed Under 37 CFR 1.97 and 1.98

The communication industry is using more and more optical or light fibers in lieu of copper wires since optical fibers have substantially greater bandwidth than traditional copper wires or cables. However, just as electrical signals which travel great distances over copper wiring must be amplified several times on their journey from one location to another, it is also necessary to amplify the light waves carrying telephonic, TV or other types of information signals.

Unfortunately, presently available techniques of light wave amplification require extremely expensive and complex and sensitive equipment. Consequently, the task of closely controlling and monitoring such light amplification equipment is of utmost importance if this expensive equipment is to be dependable and is to operate consistently.

SUMMARY OF THE INVENTION

Therefore, it is an object of the present invention to provide methods and apparatus for light amplification suitable for use with optical fiber communication systems.

It is another object of the invention to provide substantially automatic light amplification equipment which does not require a great deal of continuous human monitoring, interaction, or control.

It is still another object of the present invention to provide a light amplification system which is easy to troubleshoot and repair in the event of failure or poor performance.

These and other objects are achieved by the apparatus of this invention comprising an optical pump having an input optical fiber connection for receiving transmitted light at a selected wavelength and a plurality of output optical fibers each for carrying a portion of the amplified light at the selected wavelength to a plurality of locations. The apparatus further includes an adjustable power supply for providing the electrical power to drive the light pump and a light output sensor connected to the output of the pump for determining the output optical power from the pump. Also included is a temperature sensor located proximate the pump so as to monitor the temperature of the pump. A power "on" or start switch is included for purposes of turning on the power supply to the light amplification pump. The start switch, the pump, the power supply, the temperature sensor, the light output sensor, and the light input sensor are all connected to a microcontroller such that when the start switch is activated, the microcontroller incrementally increases power to the pump in response to activating the start switch. The microcontroller also monitors the output from the temperature sensor and the output power sensor against threshold values and incrementally adjusts the power from the power supply to the pump at a selected rate in response to temperature changes. The power to the pump is incrementally increased until the output level of the light reaches a predetermined power level.

The equipment further includes a stop switch connected to the microcontroller such that in the event the pump is to be turned off, the microcontroller incrementally decreases power going to the pump such that the light output from the pump is incrementally decreased. It should be noted however, that the incremental removal of power from the pump is significantly faster than the incremental increase of power to the pump during the turn-on sequence. A liquid crystal display (LCD) is also included along with various alarms and switches for complete monitoring of the apparatus.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

Figure 1:
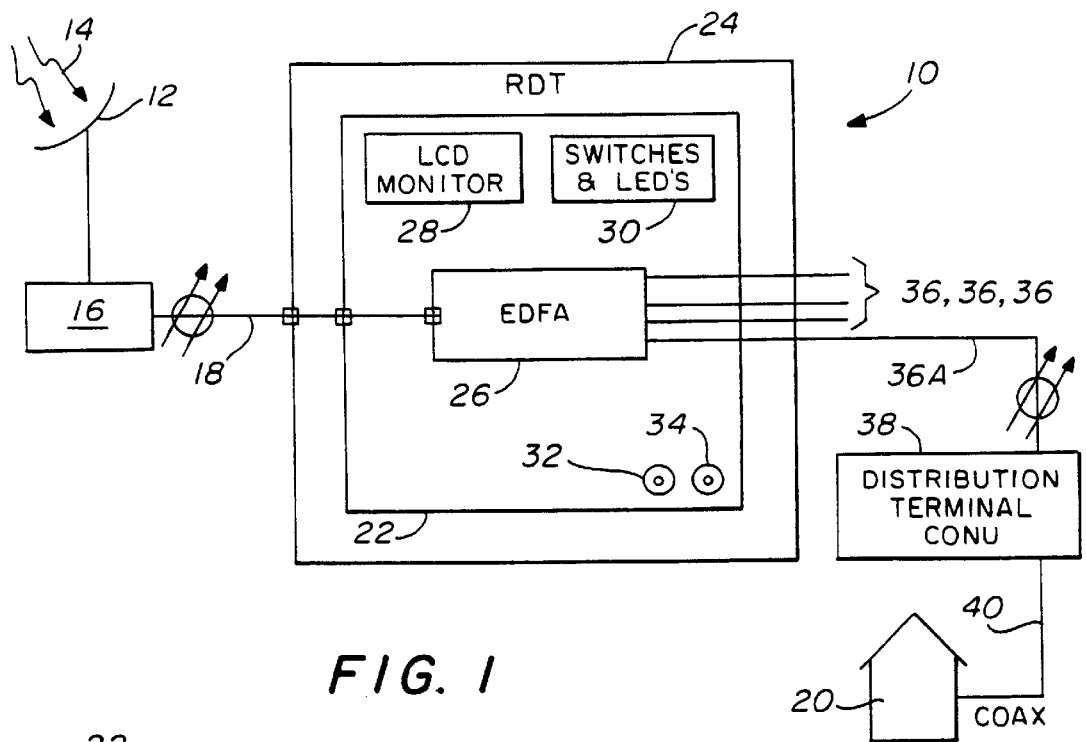
FIG. 1 is a block diagram of a communication system using light waves to transmit information signals and which system can benefit from the teachings of the present invention.

Referring now to FIG. 1 there is shown generally at 10 a communication system using light waves traveling through optical fibers as the transmission paths. As shown, in a typical communication system for transmitting television signals there is included a satellite dish 12 for collecting the high-frequency microwave signals indicated by the lightning type arrow 14 which signals are provided to a conversion circuitry 16 for receiving the electrical TV signals and then modulating light waves suitable for transmission along an optical fiber 18 with the electrical TV signals. According to one embodiment, light waves having a wavelength of 1,550 nanometers are often used for such transmission and are shown as being used in the present embodiment although it should be appreciated by those skilled in the art that light waves having other wavelengths would also be appropriate and suitable for use with the present invention. As shown, the optical fiber 18 is used to transmit the signal to an ultimate destination such as the building or home of an end user 20. In the event the building or home 20 was in close proximity to the station 16, the light waves might well be of sufficient power to require no further amplification. However, it is typical that several amplification stations are necessary along the path of the light transmission cables to assure signals of sufficient strength to a multiplicity of customers at various locations along the path. Therefore, as shown in FIG. 1, there is included light amplification apparatus 22 located in a distribution terminal 24. Distribution terminal 24 may include other types of communication distribution, such as telephones and the like, in addition to the light amplification apparatus 22. Light amplification apparatus 22 includes the light amplification pump 26 such as an EDFA (erbium doped fiber amplification) pump, a LCD monitor 28, switches and light panel 30, and RF input and output ports 32 and 34, respectively. As shown, the light amplification apparatus 22 may receive the single light input fiber 18 while providing a plurality of output fibers such as fibers 36A, 36B, 36C, and 36D. Optical fiber 36 carries the TV signals to another distribution terminal 38 which may then provide distribution by copper wiring to the home or end user 20 or may provide further amplification of the light waves in the same manner as the light amplification apparatus 22. The embodiment of FIG. 1 however, shows the light fiber communication ending at the distribution terminal 38 and copper wiring such as a coax cable 40 carrying the TV signals from distribution terminal 38 to the home or end user 20.

Figure 2:
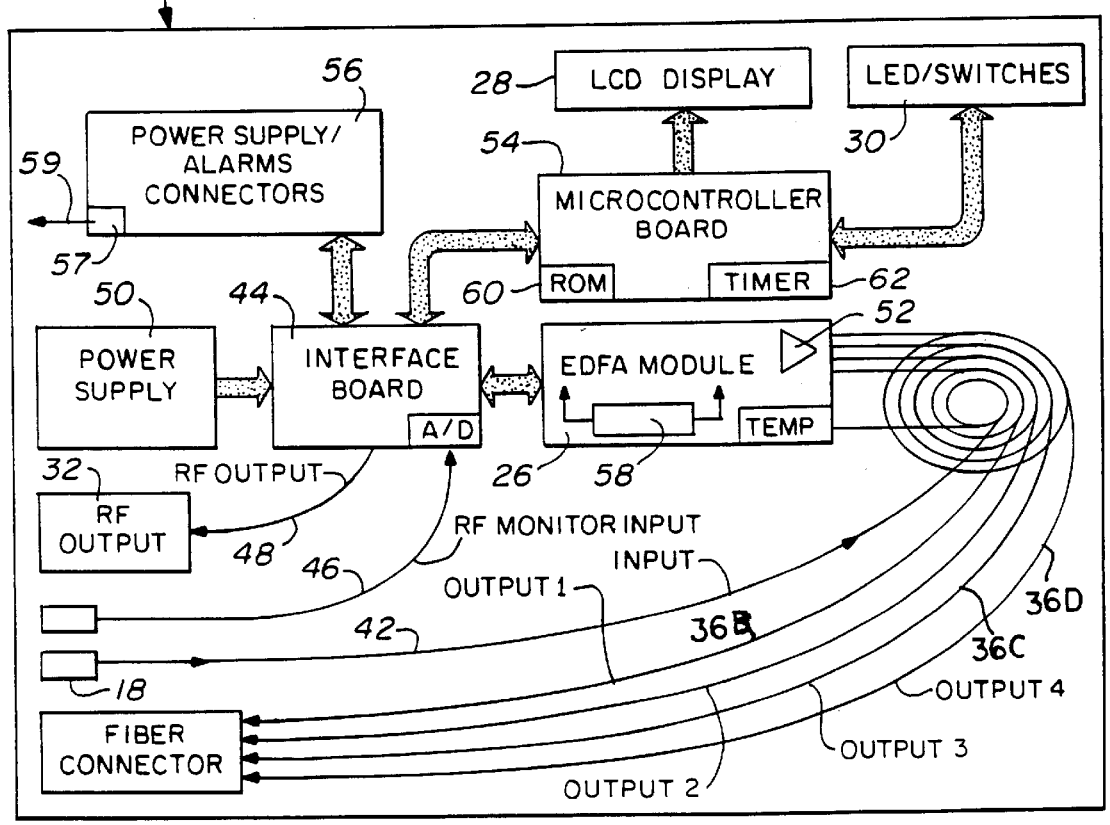
FIG. 2 is a block diagram of the light amplifier shown in FIG. 1 incorporating the teachings of the present invention.
Figures 3, 4:
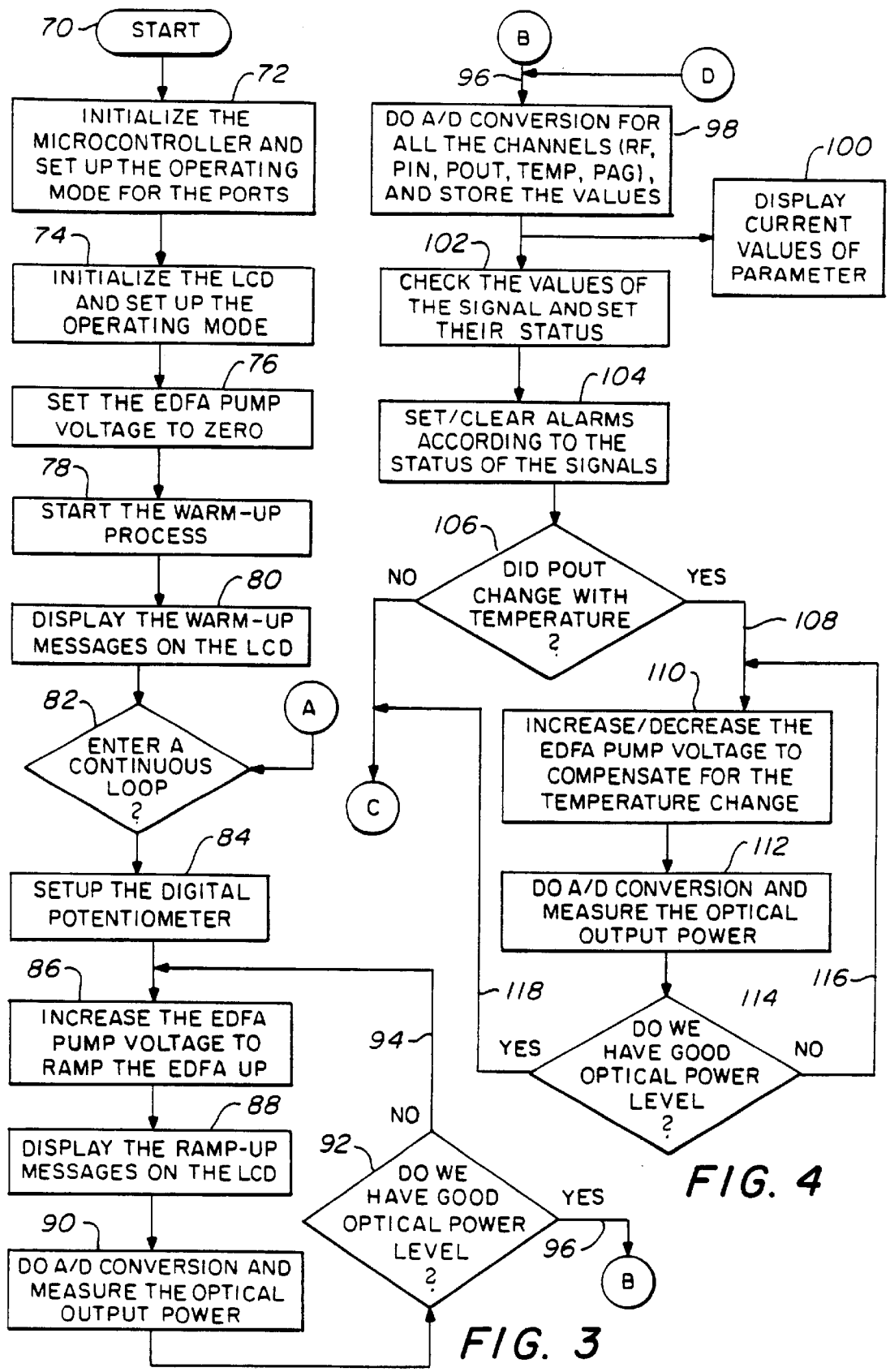
FIG. 3 through FIG. 6 disclose a flow diagram of the automatic operation of a preferred embodiment of the present invention.
Figures 5, 6:
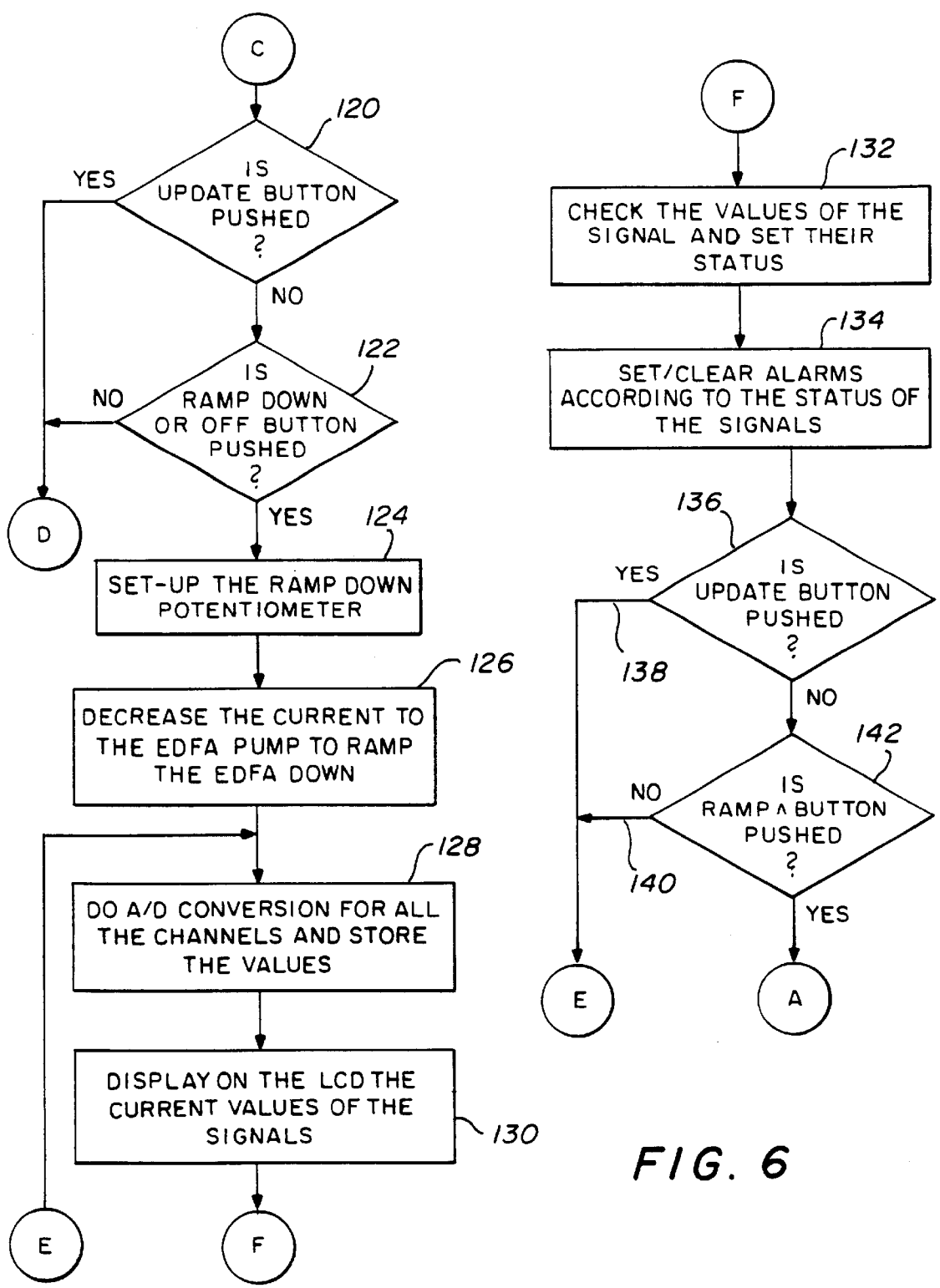

Referring now to FIG. 2, there is shown a block diagram schematic of the light amplification apparatus 22. As shown, the optical fiber 18 provides an input to the EDFA module 26 by means of a input optical fiber 42. Also as shown, the EDFA light pump 26 provides output fibers which are connected to the outputs 36A, 36B, 36C, and 36D discussed heretofore. As will be explained hereinafter, the RF monitor input on cable 46 to the interface board 44 allows detection and more detailed monitoring of the video signals that modulate the optical input signal and the parameters needed for amplification. There is also provided an RF output which will be by a copper transmission path 48 from the interface board 44 to an RF output port 32. The RF output port 32 allows on the spot monitoring by connecting up an RF signal analyzer as test equipment or even connecting a TV set so as to determine the quality of the transmitted TV signal. As shown, interface board 44 provides communications between the various components of the light amplification apparatus 22. In the embodiment shown, the electrical power supply 50 which is used to drive the light amplification pump 52 in EDFA module 26 is connected through interface board 44. Likewise, microcontroller circuitry 54 is also in communication with interface board 44 as is the power supply and alarms panel shown at reference numeral 56. Although as shown as a single panel, the power supply and alarms panel 56 could be two separate panels. It will also be appreciated that alarms panel 56 may also include a communication link 59 to a control center (not shown) such as, for example, a modem and a telephone line.

In addition to being connected to interface board 44, microcontroller circuitry 54 is further connected to the LCD display module 28 and the LED switches and light indicators 30. As was mentioned earlier, the present apparatus is intended to operate substantially in an automatic mode and therefore is carefully controlled by the microcontroller board 54. To achieve such control, it is necessary that various types of sensors be located throughout the apparatus. For example, there is shown at 58 circuitry for monitoring the light input power level with the light output power level. Further, as will be discussed, it is necessary to monitor the temperature of the pump as the efficiency and performance of light pumps vary substantially with changes in temperature. To achieve such automatic control, the microcontroller circuitry 54 includes a ROM (read only memory) 60 which is used to store a program in firmware for such monitoring. The term firmware is used to be distinguished from software in that the program is loaded into a read only solid-state memory rather than a read write memory. There is also included a timer 62 which is necessary to properly control the apparatus and will be discussed hereinafter.

Thus, there has been described to this point in general terms, light amplification apparatus for amplifying wavelengths of light used in communication. Briefly, the apparatus operates by receiving a light signal at input terminal 18 which is then amplified by the light pump 52 in EDFA module 26 and after amplification provides output on the 4 output lines connected to optical fibers 36A, 36B, 36C, and 36D. To achieve the amplification, the pump will have previously been turned"on". However, because of the delicate nature of such pumps and to avoid over driving, the power to the pump will have been increased incrementally until a desired light output power level has been achieved. During operation of the pump and the EDFA module 26, the temperature is continuously monitored along with the output power level. These readings are then used and compared to determine whether additional or less power needs to be applied to the pump 52 so to maintain a consistent output light level. In the event of maintenance and/or troubleshooting for problems, the pump may be turned off and, according to the present invention, is turned "off" incrementally in the same manner as it is turned "on" incrementally except the turn-off rate is significantly faster. The system also includes the display module 28 such that various parameters of the apparatus operation and efficiency can be monitored.

Referring now to FIGS. 3 through 6, a flow diagram of the control program stored in ROM 60 will be discussed. As shown, a start button located on the switches and light indicator panel 30 is activated as indicated by start box 70. Activation of the start button results in the microcontroller being initialized and sets up the operating mode for the various input/output ports of the microcontroller. That is, various ports in the microcontroller are assigned to monitor various inputs of the system. This is indicated by block 72. Likewise, the liquid crystal display is initialized and set with proper parameters for a selected display. For example, the size of the characters could be set as is indicated by block 74. At step 76, the EDFA input pump voltage is measured and set to zero. This is necessary to ensure that some type of stray voltage to the pump is not resulting in an optical output from the pump. Once the initialization process set forth in steps 72 through 76 is complete, a warm-up process is initiated as indicated by step 78. As was discussed earlier, light amplification pumps are substantially affected by changes in temperature. In addition, as is well known, certain electronic circuits have different operating characteristics once in a warmed-up or equilibrium stage than when initially turned "on". Thus, there is set a timer with a selected warm-up time which, in the present invention, is set at a minimum of one-half minute. During the warm-up process, the LCD display module will be controlled by the microcontroller board to display appropriate instructions or information such as "please wait" "warming up" and the like. The display may also show the remaining time before the warm-up process is complete. This display message is indicated by step 80.

At this point, the microcontroller then enters into a continuous loop as indicated by input branching block 82. The loop continuously monitors all of the steps from this point in the programming to the very last step 142 and then returns to this step 82 to repeat the process. As shown, the first operation 84 in the continuous loop initializes the digital potentiometer such that the incremental increase process for providing current to amplifier or pump 52 is at a constant rate such as 0.05 volts per step. Then at step 86, the first incremental voltage at 0.05 is applied to the EDFA pump 52. At this point, as is shown at step 88, the progress of the warm-up process is indicated such as the time remaining for full warm up, the voltage applied, etc. It will be appreciated of course, that although this step is not necessary for actual control of the present circuitry, it is desirable for individual or human monitoring of the process. As was mentioned heretofore, light output monitor 58 determines the output power of the pump 52 and converts the analog output indication to a digital signal for ready use by the microcontroller board as is indicated by step 90. The microcontroller then determines at step 92 whether the output power level is at the desired or selected level. It is very unlikely of course that the output power will be at the necessary operating level after the first step increase of pump current. Therefore, the "no" output 94 of the logic block 92 then provides a feedback loop signal to the step 86 such that steps 86, 88, and 90 are repeated.

This process continues with the power being incrementally increased at 0.05 volts per step until the selected power level is reached. Once the appropriate power level has been reached as is indicated by a "yes" signal from logic block 92 on path 96, all of the various monitors for power level input/output, RF input, temperature, and even the ground level of the pump are measured and converted from analog to digital signals as indicated by block 98. These outputs are then displayed on the display module 28 as indicated by block 100. At the same time, the value of the various monitored parameters were displayed, the outputs are also checked against their threshold and desired values as indicated by block 102 and in the event that the parameters are all within range, "okay" signals or indicator lights are provided or, if the parameters are out-of-range, alarms or red warning lights will be provided. This is indicated by block 104.

As was mentioned heretofore, light amplifier systems are extremely sensitive to changes in temperature. Therefore, there is provided a monitoring loop which is specifically set aside for determining the effects of temperature on the output of the pump. As shown, there is a logic block to determine whether the power output of the amplifier changed with a change in temperature, as indicated by logic block 106. In the event there was a change as indicated by an output on the "yes" line 108, power supply 50 is directed to either increase or decrease the pump voltage to compensate for the temperature change as indicated by block 110. After the change to the pump voltage, the optical output power is again measured and converted from analog to digital as indicated by block 112 and then this value is compared to the desired or threshold power level as indicated by block 114. If the proper optical power level still is not correct as indicated by the "no" line 116, the three steps, 110, 112, and 114, are continuously repeated. After the optical output power level has been determined to be correct, there will then be an output on the "yes" line 118 and the program advances to the logic step 120.

Logic step 120 determines whether someone has pushed one of the switches on the switch and light indicator panel 30 to obtain an update of the display on LCD display module 22 of the various system parameters. If the update button has been pushed, the program returns to step 98 and repeats the cycle. If the button has not been pushed, the program advances to logic step 122 to determine whether the "off" or ramp-down button has been activated. If the "off" button has not been activated, then the program again returns to the block 98 to continually repeat the cycle.

Eventually, in hours, days, months or even years, the "off" button on the LED switch and indicator panel 30 will be activated and the program will then advance to the shutdown mode starting at step 124. At this point, the potentiometer which determines the incremental size of the steps providing power to the light pump 52 is reincremented into larger steps than was the case for the ramp-up steps as it is not as necessary for the ramp-down process to be as gentle or slow as was the ramp-up process. After the potentiometer ramp-down steps have been set, the current to the EDFA pump is decreased as indicated by block 126. At this point, the parameters discussed heretofore with respect to block 98 are again measured and converted from analog to digital and stored in the microcontroller memory. The stored values are then displayed on the LCD panel 28 as indicated by block 130 and various signal status levels are set in preparation for final cut off and/or for a future turn on as indicated by blocks 132 and 134. During monitoring of the shutdown or maintenance process it may also be desirable to get an updated reading of the various system parameters in which case the update button on the switches and LED panel 30 may again be pushed or activated as indicated by logic block 136. If this button is activated as indicated by the "yes" line 138 from logic block 136, the programmer returns to block 128 to again determine the values and to store the new values in memory. Eventually, of course, the update button will not be pushed and there will be a determination made whether the turn-on ramp button has been pushed. During the maintenance process the on or ramp-up button will not be activated until the problems or maintenance process is complete, in which case the "no" path 140 from the logic block 142 is activated and provides a signal back to the step 128 for continuously reviewing the stored parameter values. Eventually, of course, once the maintenance process is complete, the "on" button or the ramp-up button will be pushed and the process starts from the beginning such that the program returns to the entrance of the continuous loop at block 82.

The corresponding structures, materials, acts, and equivalents of all means or step plus function elements in the claims below are intended to include any structure, material, or act for performing the function in combination with other claimed elements as specifically claimed.

We claim:

1. Apparatus for monitoring and controlling an EDFA light amplification pump comprising an optical pump having an input optical fiber connection for receiving light at a selected wavelength and carrying information, and having a plurality of output optical fibers each for receiving a portion of said amplified light at said selected wavelength and transmitting said information to a plurality of remote locations comprising:

an adjustable power supply for providing electrical power to said pump;

an optical power output sensor connected to said pump for determining the output optical power of said pump, and for providing an indication of said output optical power;

a start switch; and a microcontroller connected to said power supply, said optical output sensor, and said start switch, said microcontroller including a ROM (read only memory) for storing a start up program comprising a predetermined sequence of steps of, and said microcontroller executing said predetermined sequence of steps for incrementally increasing power to said optical pump at a selected rate until said power sensor indicates a selected output optical power level is present in response to activation of said start switch.

2. The apparatus of claim 1 and further comprising an optical power input sensor connected to said pump for determining the optical input power to said pump.

3. The apparatus of claim 1 further comprising a stop switch connected to said microcontroller such that said microcontroller incrementally decreases power from said power supply to said pump at a rate faster than said selected rate when said stop switch is activated.

4. The apparatus of claim 1 and further comprising an RF input circuit and an RF output circuit for detecting and monitoring the presence of video signals traveling over the optical fiber.

5. The apparatus of claim 1 and further comprising a display panel for providing information concerning the operating parameters of the apparatus.

6. The apparatus of claim 1 wherein said read only memory further stores a program for automatic shutdown of the apparatus.

7. The apparatus of claim 1 and further comprising a temperature sensor located proximate said light pump to monitor the temperature of said pump, and a feedback loop connected between said sensor and said microcontroller, and said microcontroller further comparing the outputs from said temperature sensor and said output light power sensor and incrementally adjusting the power from said power supply to said pump at a selected rate in response to temperature changes.

8. The apparatus of claim 5 and further comprising a display panel for displaying the video signals traveling over said optical fiber.

9. The apparatus of claim 6 wherein the RF signal spectrum is displayed.

10. The apparatus of claim 2 and further comprising a display panel for displaying the level of optical input power and optical output power.

11. The apparatus of claim 7 and further comprising a display for displaying the temperature of said circuit.

12. The apparatus of claim 1 and further including an alarms panel for indicating when selected parameters of said pump are outside of a selected tolerance level.

13. The apparatus of claim 12 and further including a communication link between said pump and a control center for remote monitoring of critical parameters.

14. A method of monitoring and controlling a light amplification pump comprising the steps of:
   activating a start switch and providing a start signal;
   providing electrical power to said pump in response to a power control signal;
   continuously determining the output light power of said pump and providing a power level indication signal of said output light power;
   controlling a microcontroller according to a predetermined sequence of steps as programmed in a ROM in response to said start signal; said microcontroller receiving said power level indication signal and providing said power control signals for,
   incrementally increasing said power to said optical pump by a first selected amount; and
   repeating said incrementally increasing step until said power level indication signal indicates said output light power level reaches a selected level.

15. The method of claim 14 and further comprising the step of monitoring parameters of said pump and displaying the value of said parameters.

16. The method of claim 14 and further comprising the steps of:
   monitoring the temperature of said pump;
   comparing the output light power and the pump temperature; and
   adjusting said power to said pump in response to temperature changes.

17. The method of claim 14 and further comprising the steps of:
   activating a stop signal; and
   incrementally decreasing said power to said pump by a second selected amount, said second selected amount greater than said first selected amount.

18. An apparatus for monitoring and controlling an EDFA light amplification pump comprising an optical pump having an input optical fiber connection for receiving light at a selective wavelength and carrying information, and having a plurality of output optical fibers each for receiving a portion of said amplified light at said selected wavelength and transmitting said information to a plurality of remote locations comprising:
   an adjustable power supply for providing electrical power to said pump;
   an optical power output sensor connected to said pump for determining the output optical power of said pump;
   a start switch; and
   a microcontroller connected to said power supply, said optical output sensor, and said start switch, said microcontroller incrementally increasing power to said pump at a selected rate in response to activation of said start switch; and
   an RF input circuit and an RF output circuit for detecting and monitoring the presence of video signals traveling over the optical fiber.

* * * * *